(12) United States Patent
Mizuno

(10) Patent No.: US 9,581,886 B2
(45) Date of Patent: *Feb. 28, 2017

(54) PROJECTOR AND LIGHT EMISSION CONTROL METHOD IN PROJECTOR

(71) Applicant: SEIKO EPSON CORPORATION, Tokyo (JP)

(72) Inventor: Kengo Mizuno, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,890

(22) Filed: Aug. 4, 2015

(65) Prior Publication Data

US 2015/0341608 A1  Nov. 26, 2015

Related U.S. Application Data

(63) Continuation of application No. 13/922,680, filed on Jun. 20, 2013, now Pat. No. 9,134,597.

(30) Foreign Application Priority Data

Jul. 17, 2012  (JP) ................................ 2012-158599

(51) Int. Cl.
G03B 21/20 (2006.01)
G03B 33/06 (2006.01)
H04N 9/31 (2006.01)

(52) U.S. Cl.
CPC ......... *G03B 21/206* (2013.01); *G03B 21/204* (2013.01); *G03B 21/2053* (2013.01);
(Continued)

(58) Field of Classification Search
CPC .... H04N 9/3182; H04N 9/319; H04N 9/3197; G03B 21/005; G03B 21/208; G03B 21/2053

See application file for complete search history.

(56) References Cited

U.S. PATENT DOCUMENTS 5,428,408 A    6/1995  Stanton
7,303,284 B2 * 12/2007  Imade ................... G03B 21/16
                                                     345/63
(Continued)

FOREIGN PATENT DOCUMENTS

CN    1619356 A    5/2005
CN    1648765 A    8/2005
(Continued)

OTHER PUBLICATIONS

U.S. Appl. No. 13/932,490, filed Jul. 1, 2013 in the name of Kengo Mizuno.
Mar. 27, 2015 Office Action issued in U.S. Appl. No. 13/932,490.

*Primary Examiner* — Sultan Chowdhury
(74) *Attorney, Agent, or Firm* — Oliff PLC

(57) ABSTRACT

A projector including: a plurality of light sources; a modulator that modulates light emitted from each of the plurality of light sources; a projection unit that projects the modulated light modulated by the modulator; a storage unit that stores grayscales of the light sources and adjustment values for adjusting the light emission amounts of the light sources in order to make white balance of the modulated light projected through the projection unit in relation to each other; and a light-emission-amount adjusting unit that adjusts the light emission amounts of the light sources based on the adjustment values corresponding to the grayscales of the light sources.

12 Claims, 4 Drawing Sheets

(52) U.S. Cl.
CPC .......... *G03B 33/06* (2013.01); *H04N 9/3158* (2013.01); *H04N 9/3164* (2013.01); *H04N 9/3182* (2013.01); *H04N 9/3194* (2013.01)

(56) References Cited

U.S. PATENT DOCUMENTS

| | | |
|---|---|---|
| 2002/0131022 A1 | 9/2002 | Shibatani et al. |
| 2003/0164927 A1* | 9/2003 | Tsukada ............. H04N 5/44513 353/31 |
| 2004/0001184 A1* | 1/2004 | Gibbons .................. H04N 5/20 353/31 |
| 2005/0073845 A1 | 4/2005 | Matsui |
| 2005/0122481 A1 | 6/2005 | Yamasaki et al. |
| 2005/0169572 A1 | 8/2005 | Itoh |
| 2005/0179871 A1 | 8/2005 | Kobayashi et al. |
| 2006/0007409 A1 | 1/2006 | Sato |
| 2006/0170883 A1 | 8/2006 | Matsui |
| 2006/0215130 A1 | 9/2006 | Nakamura et al. |
| 2009/0153447 A1 | 6/2009 | Mizusako et al. |
| 2009/0167193 A1* | 7/2009 | Ogasawara .......... G09G 3/3406 315/151 |
| 2010/0045895 A1 | 2/2010 | Komiya |
| 2011/0043764 A1 | 2/2011 | Narikawa |
| 2012/0038892 A1 | 2/2012 | Kurtz et al. |

FOREIGN PATENT DOCUMENTS

| | | |
|---|---|---|
| JP | 2004-184852 A | 7/2004 |
| JP | 2006-140839 A | 6/2006 |
| JP | 2006-178080 A | 7/2006 |
| JP | 2007-322945 A | 12/2007 |
| JP | 2008-089836 A | 4/2008 |
| JP | 2008-233487 A | 10/2008 |
| JP | 2009-145586 A | 7/2009 |
| JP | 2009-244809 A | 10/2009 |
| JP | 2009-265135 A | 11/2009 |
| JP | 2010-051068 A | 3/2010 |
| JP | 2011-044367 A | 3/2011 |
| JP | 2011-145368 A | 7/2011 |

* cited by examiner

BEFORE
ADJUSTMENT (LIGHT EMISSION OUTPUT LEVEL)
100 : 100 : 100
100 : 120 : 110 (MEASURED VALUE)
100 : 110 : 105 (DETECTED VALUE)

AFTER
ADJUSTMENT (LIGHT EMISSION OUTPUT LEVEL)
100 : 80 : 90
100 : 100 : 100 (MEASURED VALUE)
100 : 98 : 97 (DETECTED VALUE)

BEFORE
ADJUSTMENT (LIGHT EMISSION OUTPUT LEVEL)
100 : 100 : 72(90 × 0.8)
100 : 120 : 90 (MEASURED VALUE)
100 : 110 : 92 (DETECTED VALUE)

AFTER
ADJUSTMENT (LIGHT EMISSION OUTPUT LEVEL)
90 : 70 : 72
100 : 100 : 100 (MEASURED VALUE)
90 : 85 : 92 (DETECTED VALUE)

PROJECTOR AND LIGHT EMISSION CONTROL METHOD IN PROJECTOR

CROSS-REFERENCE

This is a Continuation of U.S. application Ser. No. 13/922,680 filed Jun. 20, 2013, which claims priority to Japanese Patent Application No. 2012-158599, filed on Jul. 17, 2012. The disclosures of the prior applications are hereby incorporated by reference in their entirety.

BACKGROUND

1. Technical Field

The present invention relates to a projector that projects an image on a projection surface by using a plurality of light sources and a light emission control method in the projector.

2. Related Art

There is a known projector of related art that modulates light from a light source based on an input image and projects the modulated light through a projection lens on a screen. It is further known that exchanging the light source in the projector changes the characteristics of the light source and hence the white balance, and that a time-varying change in a characteristic (illuminance) of the light source changes the white balance. A projector with a capability of adjusting an image actually projected on a screen to have appropriate white balance has therefore been proposed (see JP-A-2006-140839, for example).

Further, there is a known projector using a light source the luminance of which can be adjusted based on PWM (pulse width modulation) control, such as an LED and a laser (see JP-A-2010-051068, for example).

On the other hand, in a projector using a plurality of light sources, the light sources do not always have the same optical output characteristics. Specifically, when the light emission amounts of the light sources are changed, the actual light amounts sometimes do not change in the same manner. For example, when the light emission amounts of the light sources are changed in order to change the brightness on a projection screen, the white balance disadvantageously changes in some cases. As described above, in a projector using a plurality of light sources, appropriate adjustment of the white balance is not readily made because changing the light emission amounts of the light sources changes the white balance in a complicated manner.

SUMMARY

An advantage of some aspects of the invention is to provide a projector capable of appropriately adjusting the white balance of projected light fluxes from a plurality of light sources and a light emission control method in the projector. A projector according to an aspect of the invention includes a plurality of light sources, a modulator that modulates light emitted from each of the plurality of light sources, a projection unit that projects the modulated light modulated by the modulator, a storage unit that stores grayscales of the light sources and adjustment values for adjusting the light emission amounts of the light sources in order to make white balance of the modulated light projected through the projection unit appropriate with the grayscales and the adjustment values stored in relation to each other, and a light-emission-amount adjusting unit that adjusts the light emission amounts of the light sources based on the adjustment values corresponding to the grayscales of the light sources.

According to the aspect of the invention, the white balance of the modulated light can be appropriately adjusted based on the adjustment values stored in advance in relation to the grayscales of the light sources even when the grayscales of the plurality of light sources are changed and hence the white balance of the modulated light changes. A high-quality image can thus be projected.

The projector according to the aspect of the invention described above may further include light source driving unit that drives the plurality of light sources, and the light-emission-amount adjusting unit may control the light source drivers based on inputted grayscales of the light sources and the adjustment values acquired from the storage unit to adjust the light emission amounts of the light sources. According to the projector of the configuration described above, when the laser light sources are driven to emit light based on the inputted grayscales of the light sources, adjusting the light emission amounts of the light sources based on the adjustment values stored in relation to the grayscales allows the white balance to be appropriately adjusted in correspondence with the light emission amounts of the light sources.

In the projector according to the aspect of the invention described above, the storage unit may store the grayscales of the light sources and the adjustment values in relation to each other, and the projector may further include a controller that adjusts the light emission amounts of the light sources by using the light-emission-amount adjusting unit based on the adjustment values stored in the storage unit when the grayscales of the light sources are set at specific values, whereas adjusting the light emission amounts of the light sources by using the light-emission-amount adjusting unit based on estimated values calculated from the adjustment values stored in the storage unit when the grayscales of the light sources are set at values different from the specific values. According to the projector of the configuration described above, the white balance can be adjusted in correspondence with a variety of grayscales even when only a small number of adjustment values for adjusting the white balance are available. Further, since a large number of adjustment values are not necessary, the period necessary to acquire adjustment values can be shortened.

The projector according to the aspect of the invention described above may further include an adjustment value acquisition unit that acquires adjustment values that make the white balance of the modulated light appropriate when the grayscales of the light sources are set at the specific values and stores the grayscales of the light sources and the adjustment values in relation to each other in the storage unit. According to the projector of the configuration described above, storing the grayscales of the light sources and the adjustment values for adjusting the white balance for the grayscales in relation to each other allows appropriate adjustment of the white balance in correspondence with the light emission amounts of the light sources.

The projector according to the aspect of the invention described above may further include a color light converter that produces a plurality of color light fluxes from the light from one of the light sources based on color conversion and/or in a spectroscopic manner and a modulator that modulates the plurality of color light fluxes produced by the color light converter, and the controller may determine adjustment values for adjusting the light amounts of the color light fluxes based on the grayscales of the light sources and from the adjustment values stored in the storage unit or the estimated values calculated from the adjustment values stored in the storage unit and further determine adjustment values for adjusting the light sources to adjust the light emission amounts of the light sources by using the light-emission-amount adjusting unit. According to the projector of the configuration described above, in the configuration in which a plurality of color light fluxes are produced from one of the light sources based on color conversion and/or in a spectroscopic manner, the white balance can be appropriately adjusted in correspondence with the light emission amounts of the light sources.

The projector according to the aspect of the invention described above may further include a detector that detects the white balance of the modulated light and a detected value holding unit that holds the detected values from the detector after the detector detects the white balance of the modulated light produced when the grayscales of the light sources are set at the specific values, and the adjustment value acquisition unit acquires the detected values held by the detected value holding unit as adjustment values.

According to the projector of the configuration described above, when the light fluxes emitted from the plurality of light sources are combined with each other and projected, the white balance of the light emission amounts of the light sources can be appropriately adjusted based on the detected values from the detector.

In the projector according to the aspect of the invention described above, the adjustment value acquisition unit may acquire the adjustment values based on measured values obtained by measuring the white balance of the modulated light outside the projector and the detected values obtained by detecting the white balance of the modulated light with the detector. According to the projector of the configuration described above, the adjustment values used when the grayscales of the light sources are set at the specific values can be quickly acquired based on the measured values measured outside the projector and the detected values from the detector.

A light emission control method according to another aspect of the invention is used in a projector including a plurality of light sources, a projection unit that modulates light emitted from each of the plurality of light sources and projects the modulated light, and a storage unit that stores grayscales of the light sources and adjustment values for adjusting the light emission amounts of the light sources in order to make white balance of the modulated light appropriate with the grayscales and the adjustment values stored in relation to each other, and the method includes adjusting the light emission amounts of the light sources based on the adjustment values corresponding to the grayscales of the light sources.

According to the aspect of the invention, the white balance of the modulated light can be appropriately adjusted based on the adjustment values stored in advance in relation to the grayscales of the light sources even when the grayscales of the plurality of light sources are changed and hence the white balance of the modulated light changes. A high-quality image can thus be projected.

According to the aspects of the invention, the white balance can be appropriately adjusted in correspondence with the light emission amounts of the light sources in the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment to which the invention is applied will be described below with reference to the drawings.

Figure 1:
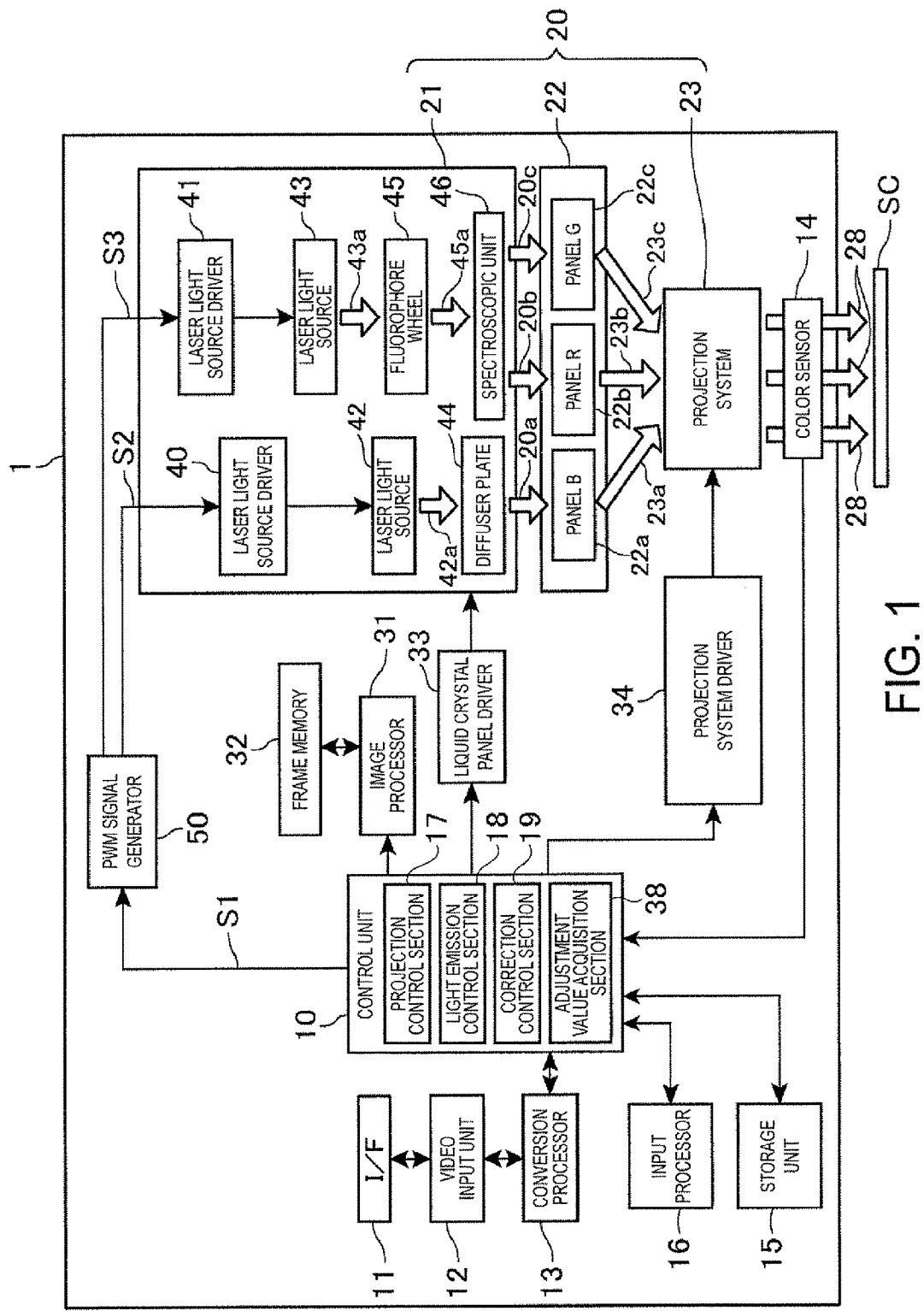
FIG. 1 is a functional block diagram of a projector.

FIG. 1 is a block diagram showing a functional configuration of a projector 1 according to the embodiment. The projector 1, which works as a display apparatus that projects an image on a screen SC (projection surface), is connected to an external image supply apparatus (not shown), such as a PC or any other computer and a variety of image players, via an I/F (interface) 11 and projects an image based on digital image data inputted through the interface 11 on the screen SC.

The projector 1 includes a projection unit 20, which forms an optical image, and an image processing system that electrically processes an image signal inputted to the projection unit 20, and the projection unit 20 and the image processing system operate under the control of a control unit 10.

The projection unit 20 includes a light source section 21, a light modulation device (modulator) 22, and a projection system 23. The light source section 21 includes a light source the luminance of which can be controlled by using a pulse signal based on PWM control, such as an LED and a laser light source. In the present embodiment, a configuration including laser light sources 42 and 43 formed of two blue semiconductor laser devices is presented by way of example. The laser light sources 42 and 43 may alternatively be formed of a plurality of semiconductor devices that emit a plurality of laser light beams.

The light modulation device 22 receives a signal from the image processing system, which will be described later, and modulates light beams outputted from the light source section 21 based on the signal. The modulated light fluxes (image light fluxes) 23a, 23b, and 23c having undergone the modulation in the light modulation device 22 are guided to the projection system 23. The light modulation device 22 is specifically configured based, for example, on a method using three transmissive or reflective liquid crystal light valves corresponding to RGB colors. It is assumed in the present embodiment that the light modulation device 22 has a configuration including three transmissive liquid crystal panels corresponding to RGB color light beams, that is, a liquid crystal panel 22a, which modulates blue light B, a liquid crystal panel 22b, which modulates red light R, and a liquid crystal panel 22c, which modulates green light G. The liquid crystal panels 22a, 22b, and 22c provided in the light modulation device 22 are driven by a liquid crystal panel driver 33, which will be described later, and an image is formed by changing light transmittance in pixels arranged in a matrix in each of the liquid crystal panels.

The RGB color light fluxes having undergone the modulation in the light modulation device 22 are combined with each other in a cross dichroic prism (not shown), and the combined light is guided to the projection system 23.

The projection system 23, although not specifically shown, includes a projection lens that is a group of lenses for projecting the modulated light fluxes 23a, 23b, and 23c having undergone the modulation in the light modulation device 22 on the screen SC to form an image and a variety of mechanisms that change a variety of states of the projection system 23, such as the states of an aperture, zooming, and a shift position of the projection lens. Further, the projection system 23 is connected to a projection system driver (optical system adjuster) 34, which controls and drives the mechanisms that change the states of the projection system 23.

A PWM signal generator (light-emission-amount adjusting unit) 50, which outputs pulse signals S2 and S3 for controlling light emission of the laser light sources 42 and 43, is connected to the light source section 21. The light source section 21 includes a laser light source driver (light source driver) 40, which drives the laser light source 42 in accordance with the pulse signal S2 inputted from the PWM signal generator 50 and switches the state of the laser light source 42 between a light-on state and a light-off state, and a laser light source driver (light source driver) 41, which drives the laser light source 43 in accordance with the pulse signal S3 and switches the state of the laser light source 43 between a light-on state and a light-off state.

The laser light source 42 emits a blue laser light beam 42a when driven by the laser light source driver 40, and the blue laser light beam 42a passes through a diffuser plate 44, where the blue laser light beam 42a is diffused. The diffused laser light is incident as blue light 20a on the liquid crystal panel 22a in the light modulation device 22 and modulated by the liquid crystal panel 22a. On the other hand, the laser light source 43 also emits a blue laser light beam when driven by the laser light source driver 41, as the laser light source 42 does. The blue laser light beam emitted from the laser light source 43 impinges on a fluorophore material on a fluorophore wheel 45, which converts the blue laser light beam into yellow light 45a, which is incident on a spectroscopic unit 46. The spectroscopic unit 46 separates the yellow light 45a into components in terms of wavelength, and separated red light 20b and green light 20c are incident on the liquid crystal panel 22b and the liquid crystal panel 22c, respectively. That is, in the light source section 21, the fluorophore wheel 45 and the spectroscopic unit 46 function as a color light converter that produces a plurality of color light fluxes from the light beam emitted from the laser light source 43.

The PWM signal generator (light-emission amount adjusting unit) 50 has a function of causing the laser light sources 42 and 43 to go on and adjusting the luminance of each of the laser light sources 42 and 43 to desired luminance by driving the laser light sources 42 and 43 based on PWM control in accordance with a control signal S1 inputted from the control unit 10. The PWM signal generator 50 generates the signals S2 and S3, each of which specifies a pulse frequency and a pulse width (ON period), in accordance with the control signal S1 inputted from the control unit 10 and outputs the signals S2 and S3 to the light source section 21 via a limiter.

The laser light source drivers 40 and 41 cause the laser light sources 42 and 43 to go on when the pulses in the signals S2 and S3 rise to an ON level, whereas causing the laser light sources 42 and 43 to go off when the pulses fall to an OFF level. In the projector 1, a video input unit 12, which has the interface 11, and a conversion processor 13, which performs scaling on image data inputted to the video input unit 12, are connected. The conversion processor 13, for example, converts the resolution of the image data and outputs the processed image data to the control unit 10. A conceivable example of the image data inputted to the projector 1 is motion image (video) data. The image data may alternatively be still image data.

For example, the interface 11 has a DVI (Digital Visual Interface) interface, to which a digital video signal is inputted, a USB interface, a LAN interface, an S video terminal, to which a composite video signal based on NTSC, PAL, SECAM, or any other standard is inputted, an RCA terminal, to which a composite video signal is inputted, a D terminal, to which a component video signal is inputted, an HDMI connector compliant with the HDMI (registered trademark) standard, a connector compliant with the DisplayPort (trademark) standard established by VESA (Video Electronics Standards Association), and the like. In preparation for an input of an analog video signal through the interface 11, the video input unit 12 may be configured to have an A/D conversion circuit that converts the analog video signal into digital image data. Further, the interface 11 may be provided with a wireless communication interface.

The image processing system in the projector 1 is primarily formed of the control unit 10, which oversees and controls the entire projector 1. The projector 1 further includes a storage unit 15, an input processor 16, an image processor 31, and the liquid crystal panel driver 33. The storage unit 15 stores data processed by the control unit 10 and a control program executed by the control unit 10. The input processor 16 detects user operation performed through a remote control or an operation panel (not shown). The image processor 31 processes image data and loads the resultant image signal into a frame memory 32. The liquid crystal panel driver 33 drives the liquid crystal panels 22a, 22b, and 22c in the light modulation device 22 based on the image signal outputted from the image processor 31 for image drawing.

The control unit 10 reads and executes the control program stored in the storage unit 15 to control the components in the projector 1. The control unit 10 detects the content of user operation based on operation information inputted from the input processor 16 and controls the image processor 31, the liquid crystal panel driver 33, the projection system driver 34, and the PWM signal generator 50 in accordance with the operation to project an image on the screen SC.

The input processor 16 has not only a function of receiving a wireless signal transmitted from the remote control (not shown) with which the user operates the projector 1, decoding the wireless signal, and detecting operation performed through the remote control but also a function of detecting operation performed on a button on the operation panel (not shown) of the projector 1. The input processor 16 generates an operation signal representing the operation performed on the remote control or the operation panel and outputs the operation signal to the control unit 10. Further, the input processor 16 controls a light-on state of an indicator lamp on the operation panel (not shown) in accordance with the action state and settings of the projector 1 under the control of the control unit 10.

The image processor 31 acquires the image data outputted from the conversion processor 13 under the control of the control unit 10 and determines the image size or resolution, whether the image data is formed of still images or motion images, and attributes of the image data, such as the frame rate in the case of motion images. The image processor 31 then loads images into the frame memory 32 on a frame basis. The image processor 31 further performs resolution conversion when the resolution of the acquired image data differs from the display resolution of the liquid crystal panels in the light modulation device 22, performs enlargement/ reduction when a zooming instruction is issued by the user who operates the remote control or the operation panel, and loads the processed images into the frame memory 32. The image processor 31 then outputs the images loaded into the frame memory 32 on a frame basis as a display signal to the liquid crystal panel driver 33.

The control unit 10 provides functions of a projection control section 17, a light emission control section (controller) 18, a correction control section 19, and an adjustment value acquisition section 38 by executing the control program stored in the storage unit 15.

The projection control section 17 initializes the components in the projector 1, controls the PWM signal generator 50 to cause the laser light sources 42 and 43 to go on, controls the image processor 31 and the liquid crystal panel driver 33 to cause the liquid crystal panels 22a, 22b, and 22c to draw images for image projection in accordance with operation detected by the input controller 16. The projection control section 17 further controls the projection system driver 34 to change the states of the projection system 23. The projection system driver 34 controls the state of an aperture, a lens shift position, and the state of zooming of the projection system 23. The projection control section 17 may further control, for example, the states of a cinema filter and an anamorphic lens (not shown) present on the optical path, and the state of an illumination aperture that adjusts the amount of light with which the liquid crystal panels are illuminated.

The light emission control section (controller) 18 generates the control signal S1 and outputs the control signal S1 to the PWM signal generator 50 when projection is initiated and during the projection. The control signal S1 specifies the pulse width and the pulse cycle or a pulse-off period of each of the pulse signals S2 and S3 to be inputted to the laser light source drivers 40 and 41. The light emission control section 18 adjusts the light emission amounts of the laser light sources 42 and 43 by changing the pulse width and the pulse cycle or the pulse-off period.

The correction control section 19 calculates the inclination of the screen SC with respect to the projector 1 (projection angle) and the projection distance from the projector 1 to the screen SC and performs trapezoidal distortion correction and other correction. The correction control section 19 corrects the distortion of a projected image on the screen SC by controlling the image processor 31 based on the calculated projection angle and projection distance to deform an image loaded into the frame memory 32. A satisfactory rectangular image is thus displayed. The correction control section 19, for example, when it detects any disorder of a projected image on the screen SC or when operation performed on the operation panel (not shown) instructs to perform the correction, calculates the projection angle and the projection distance to newly calculate a correction parameter and corrects the projected image in accordance with the calculated parameter. The adjustment value acquisition section (adjustment value acquisition unit) 38 acquires adjustment values for appropriately adjusting the white balance of modulated light (projected light) 28, which is projected through the projection system 23 on the screen SC, based on detected values from a color sensor (detector) 14, which detects the color temperature of the modulated light 28. The modulated light 28 is combined light formed of the blue light 20a, the red light 20b, and the green light 20c emitted from the laser light sources 42 and 43 and combined by the projection system 23.

The projector 1 has a configuration in which the two laser light sources 42 and 43 emit three color light beams, the red (R), green (G), and blue (B) laser beams. To this end, the blue laser light beam 42a emitted from the laser light source 42 forms the blue light 20a, whereas the blue laser light beam 43a emitted from the laser light source 43 is converted into the yellow light 45a, which is then separated into the red light 20b and the green light 20c in a spectroscopic manner. For example, assume that the laser light sources 42 and 43 have the same output level and the diffuser plate 44 and the fluorophore wheel 45 totally reflect light (have reflectance of 100%), and that the spectroscopic unit 46 halves the amount of light inputted thereto and hence the red light 20b and the green light 20c have the same light amount. Under the assumption described above, when the laser light sources 42 and 43 are driven to emit light beams of the same luminance, the light amount of each of the red light 20b and the green light 20c is one-half the light amount of the blue light 20a. In other words, to allow the color light fluxes, the blue light 20a, the red light 20b, and the green light 20c, to have the same light amount, the luminance of the laser light source 42 needs to be one-half the luminance of the laser light source 43. In the projector 1, the laser light sources 42 and 43 are therefore driven to emit light beams of different luminance values in order to allow the amounts of the color light fluxes, the blue light 20a, the red light 20b, and the green light 20c, to be preferably balanced.

In the present embodiment, the ratio (proportion) between the luminance of the laser light source 42 and the luminance of the laser light source 43 is so set that the light amount of the blue light 20a is lower than the amounts of the red light 20b and the green light 20c. Adjustment values for appropriately adjusting the amounts of the color light beams emitted from the laser light sources 42 and 43 are stored in the storage unit 15, which will be described later in detail. The light amount ratio among the blue light 20a, the red light 20b, and the green light 20c is affected in some cases by a variety of conditions, such as the output levels of the laser light sources 42 and 43, the conversion efficiency at which the fluorophore wheel 45 converts the blue laser light 43a into the yellow light 45a, the state of diffusion in the diffuser plate 44, spectral characteristics of the spectroscopic unit 46, and the states of the liquid crystal panels 22a, 22b, 22c. In consideration of the effects described above, the projector 1 adjusts the white balance in such a way that exact white is reproduced.

In the projector 1, in which the light beams emitted from the two laser light sources 42 and 43 are combined with each other and projected, however, the light emission amounts of the laser light sources 42 and 43 change with time differently with each other by a large amount due to individual product differences. When the light emission amounts of the laser light sources 42 and 43 change with time differently with each other, the light amount ratio among the blue light 20a, the red light 20b, and the green light 20c disadvantageously deviates from a desired value.

The projector 1 is further so configured that the grayscales of the laser light sources 42 and 43 can be changed based on an input from the user. The user can change the brightness of a projected image stepwise by carrying out operation of changing the grayscales of the laser light sources 42 and 43. The light amount ratio among the R, G, and B components of the modulated light 28, however, deviates from a desired value when the grayscales of the laser light sources 42 and 43 are changed due to individual product differences in the grayscale versus light emission amount relationship between the laser light sources 42 and 43, an effect of the fluorophore wheel 45, the spectroscopic unit 46, or the diffuser plate 44, or an effect of the difference in the optical paths from the laser light sources 42 and 43 to the projection system 23. When the light amount ratio among the R, G, and B components of the modulated light 28 deviates from a desired value as described above, the white balance of a projected image projected on the screen SC deviates from a desired state and hence exact white cannot be reproduced. In the projector 1 including the two laser light sources 42 and 43, the white balance changes in a complicated manner due to the variety of factors described above.

To appropriately adjust the white balance that changes in a complicated manner as described above, the projector 1 is so manufactured as a product that the white balance is appropriately adjusted by using an external process sensor (not shown). After the external process sensor is used to appropriately adjust the white balance, the storage unit 15 stores detected values from the internal color sensor 14 in the projector 1. An ND filter or any other suitable component may be used as appropriate to attenuate light to be introduced to each of the external sensor and the color sensor 14. A procedure in which the storage unit 15 stores detected values from the color sensor 14 as adjustment values for adjusting the white balance in relation to the grayscales of the laser light sources 42 and 43 in a manufacturing step of the projector 1 will next be described with reference to the flowchart shown in FIG. 2.

Figure 2:
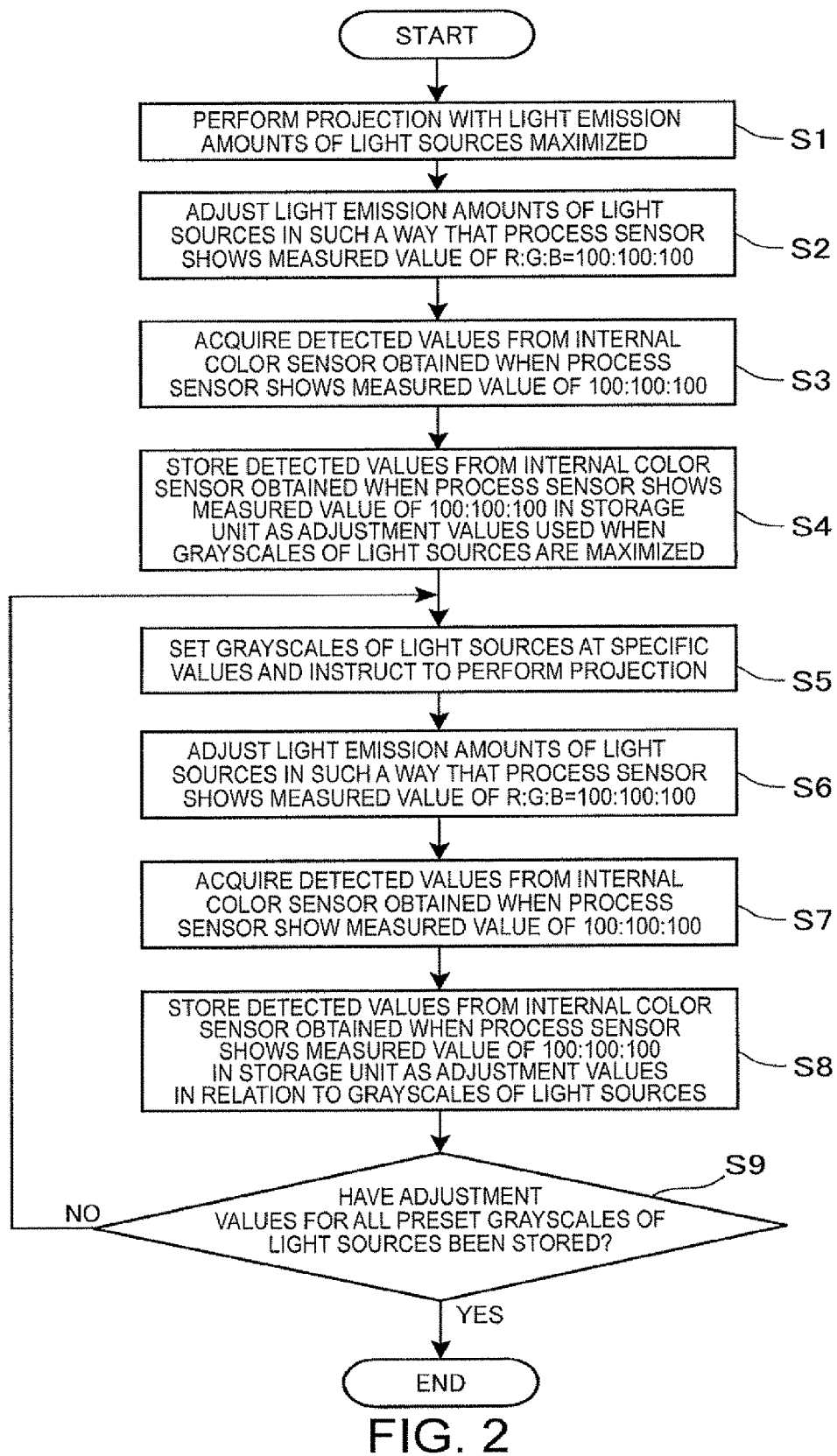
FIG. 2 is a flowchart showing a procedure in which a storage unit stores grayscales of laser light sources and adjustment values for adjusting white balance.

FIG. 2 is a flowchart showing the procedure in which the storage unit 15 stores adjustment values for adjusting the white balance when the grayscales of the laser light sources 42 and 43 are changed in a manufacturing step of the projector 1. A description will be made of the procedure in which the storage unit 15 stores adjustment values for adjusting the white balance in relation to the grayscales of the laser light sources 42 and 43 in a manufacturing step of the projector 1 with reference to FIG. 2.

First, in response to operator's operation of setting maximum grayscales of the laser light sources 42 and 43, the control unit 10 controls the PWM signal generator 50 by using the function of the light emission control section 18 to maximize the light emission amounts of the laser light sources 42 and 43 and instructs to project the modulated light 28 (step S1). The control unit 10 then adjusts the light emission amounts of the laser light sources 42 and 43 by using the function of the light emission control section 18 in such a way that the external sensor provided outside the projector 1 shows that a measured ratio among the RGB components in a projected image is 100:100:100 (step S2). When the external sensor shows that a measured ratio among the RGB components in a projected image is 100:100:100, the white balance provided by the projector 1 has been appropriately adjusted and exact white is reproduced on the screen SC. It is noted that values measured with the external sensor can be inputted to the projector 1 via the input processor 16.

Figure 3A:
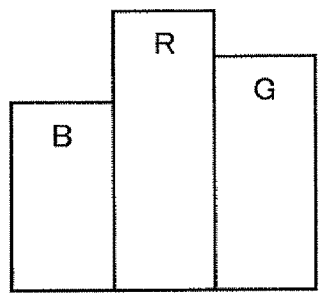
FIGS. 3A to 3D show light emission output levels, measured values, and detected values of each color light flux.
Figure 3B:
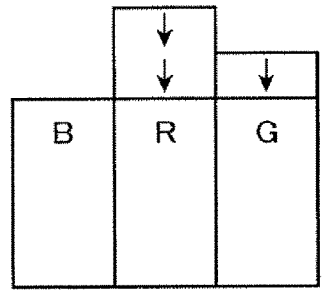

To adjust the light emission amounts in order to make the white balance appropriate, the following procedure may be used: The projection is performed with the light emission amounts of the laser light sources 42 and 43 maximized (step S1); the ratio among the RGB components in the projected image is measured with the external sensor; a color light flux of a minimum light emission output level is identified; and the light emission output levels of the other color light fluxes are lowered in accordance with the minimum light emission output level to adjust the RGB ratio. For example, when the laser light sources 42 and 43 are driven to provide maximum light emission amounts and the external sensor shows a measured value of R:G:B=120:110:100 as shown in FIG. 3A, the control unit 10 makes adjustment by using the function of the light emission control section 18 in such a way that the light emission output levels of the red light R and the green light G are lowered in accordance with the light emission output level of the blue light B having the lowest measured value. The light emission amounts of the laser light sources 42 and 43 are thus so adjusted that the external sensor shows a measured value of R:G:B=100:100:100 as shown in FIG. 3B.

The control unit 10 then acquires detected values from the color sensor 14 in the projector 1 obtained when the external sensor shows the measured value of R:G:B=100:100:100 by using the function of the adjustment value acquisition section 38 (step S3). The color sensor 14 thus detects the light amount ratio among the RGB components of the modulated light 28 produced when the projector 1 provides appropriate white balance and the grayscales of the laser light sources 42 and 43 are 100%, which is the maximum. In the present embodiment, the grayscales of the laser light sources 42 and 43 are so set that the brightness of a projected image is changeable between 0% and 100%. The grayscales of the laser light sources 42 and 43 can be arbitrarily changed through user operation, and the brightness of a projected image is maximized when the grayscales are set at 100%.

The adjustment value acquisition section 38 subsequently stores the detected values from the color sensor 14 obtained when the external sensor shows the measured value of 100:100:100 in the storage unit 15 as adjustment values used when the grayscales of the laser light sources 42 and 43 are maximized (step S4). That is, the detected values from the color sensor 14 and the grayscales of the laser light sources 42 and 43 are stored in the storage unit 15 in relation to each other as adjustment values for adjusting the white balance. For example, when the grayscales of the laser light sources 42 and 43 are 100% and the white balance is made appropriate, the color sensor 14 show detected values of R:G:B=98:97:100 as shown in FIG. 3B, and the detected values are stored in the storage unit 15 as adjustment values used when the grayscales are 100%.

Figure 3C:
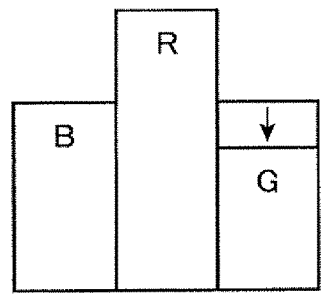
Figure 3D:
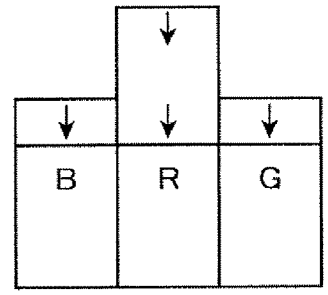

The control unit subsequently controls the PWM signal generator 50 by using the function of the light emission control section 18 to change the grayscales of the laser light sources 42 and 43 to specific values and instructs to project the modulated light 28 (step S5). The control unit 10 used one of the color light fluxes as a reference and changes the grayscales of the laser light sources 42 and 43 by changing the light emission output level of the reference color light flux. FIG. 3C shows a case where the green light G is used as the reference and the grayscales of the laser light sources 42 and 43 are changed to 80% with reference to the green light G. A description will be made of the case where the green light G is used as the reference. When the grayscales of the laser light sources 42 and 43 are 100% and the white balance is made appropriate, the control unit 10 changes the grayscales of the laser light sources 42 and 43 with reference to the light emission output level of the green light G=90 (see FIG. 3B). That is, to change the grayscales of the laser light sources 42 and 43 to 80%, the light emission output level of the reference green light G is first changed to 90*0.8=72. With the light emission output level of the green light G fixed to 72, the light emission amounts of the laser light sources 42 and 43 are then so adjusted that the external sensor shows a measured value of R:G:B=100:100:100 (step S6).

The control unit 10 next acquires detected values from the color sensor 14 obtained when the grayscales of the laser light sources 42 and 43 are 80% and the external sensor shows a measured value of R:G:B=100:100:100 by using the function of the adjustment value acquisition section 38 (step S7). The color sensor 14 thus detects the light amount ratio among the RGB components of the modulated light 28 produced when the projector 1 provides appropriate white balance and the grayscales of the laser light sources 42 and 43 are 80%. The adjustment value acquisition section 38 subsequently stores detected values of R:G:B=85:92:90 from the color sensor 14 obtained when the external sensor shows the measured value of 100:100:100 in the storage unit 15 as adjustment values used when the grayscales of the laser light sources 42 and 43 are 80% (step S8).

The grayscales of the laser light sources 42 and 43 that are stored in the storage unit 15 in relation to adjustment values for adjusting the white balance can be arbitrarily set. For example, consider five grayscales of the laser light sources 42 and 43, 100%, 80%, 60%, 40%, and 20%, and the grayscales of the laser light sources and detected values from the color sensor 14 obtained when the white balance is appropriate may be stored in relation to each other as adjustment values for adjusting the white balance.

To change the grayscales of the laser light sources 42 and 43 to 60% with reference to the light emission output level of the green light G, the light emission output level of the reference green light G is first changed to 90*0.6=54 (step S5), as in the case described above where the grayscales are changed to 80%. With the light emission output level of the green light G fixed to 54, the light emission amounts of the laser light sources 42 and 43 are then so adjusted that the external sensor shows a measured value of R:G:B=100:100: 100 (step S6). Detected values from the color sensor 14 obtained when the external sensor shows the measured value of R:G:B=100:100:100 are then acquired (step S7), and the detected values are stored in the storage unit 15 as adjustment values used when the grayscales of the laser light sources 42 and 43 are 60% (step S8).

The operator determines whether adjustment values for adjusting the white balance for all the preset grayscales of the laser light sources 42 and 43 have been stored in the storage unit 15 (step S9). When there are still any grayscales of the laser light sources 42 and 43 for which adjustment values need to be recorded (step S9: No), the steps S5 to S8 for the grayscales are repeated. When it is determined that adjustment values for adjusting the white balance for all the preset grayscales have been recorded (step S9: Yes), the operator finishes storing adjustment values associated with grayscales and used to adjust the white balance in the storage unit 15.

Figure 4:
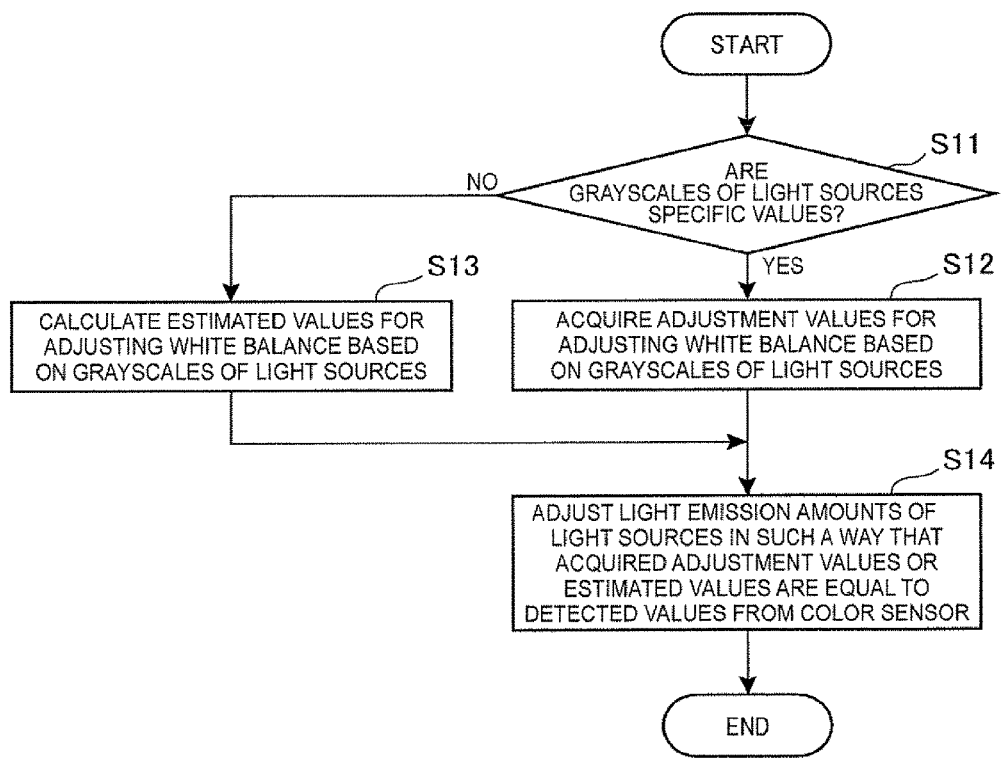
FIG. 4 is a flowchart showing the action of a control unit that adjusts the white balance.

As described above, the storage unit 15 in the projector 1 stores detected values from the color sensor 14, that is, the light amount ratio among the RGB components of the modulated light 28, obtained when the grayscales of the laser light sources 42 and 43 are set at specific values and the white balance of the modulated light 28 is made appropriate. The projector 1, when it is activated or when the grayscales are changed, adjusts the white balance based on the grayscales of the laser light sources 42 and 43 and the adjustment values stored in the storage unit 15 and used to adjust the white balance when the specific grayscales are set. The action of the projector 1 that adjusts the white balance based on specific grayscales of the laser light sources 42 and 43 will next be described with reference to the flowchart shown in FIG. 4.

First, when the projector 1 is activated or when the projector 1 detects that user has operated the projector 1 to change the grayscales of the laser light sources 42 and 43, the control unit 10 determines whether or not the grayscales of the laser light sources 42 and 43 having been set are specific values stored in advance in the storage unit 15 in relation to adjustment values for adjusting the white balance (step S11). When the control unit 10 determines that the grayscales of the laser light sources 42 and 43 are specific grayscales related to adjustment values for adjusting the white balance stored in advance in the storage unit 15 (step S11: Yes), the control unit 10 acquires the adjustment values stored in relation to the grayscale from the storage unit 15 by using the function of the adjustment value acquisition section 38 (step S12). When the control unit 10 determines that the grayscales of the laser light sources 42 and 43 are not specific values related to adjustment values for adjusting the white balance stored in advance in the storage unit 15 (step S11: No), the control unit 10 calculates estimated values for appropriately adjusting the white balance for the currently set grayscales based on the specific grayscales stored in the storage unit 15 and the adjustment values stored in the storage unit 15 in relation to the specific grayscales by using the function of the adjustment value acquisition section 38 (step S13). A description will now be made of an example of a method for calculating estimated values for appropriately adjusting the white balance for currently set grayscales based on specific grayscales stored in the storage unit 15 and adjustment values stored in the storage unit 15 in relation to the specific grayscales.

The description will be made based on the example described above. The storage unit 15 stores the five specific grayscales of the laser light sources 42 and 43, 100%, 80%, 60%, 40%, and 20%, and adjustment values for adjusting the white balance in relation to each other. When it is determined that the currently set grayscales are not any of the grayscales stored in advance in the storage unit 15 (step S11: No), the control unit 10 calculates estimated values used to adjust the white balance and corresponding to the set grayscales based on the specific grayscales stored in the storage unit 15 and the adjustment values for the specific grayscales by using linear interpolation, a quadratic function interpolation, a spline interpolation, or any other suitable interpolation method. For example, when the grayscales of the laser light sources 42 and 43 set by the user are 90%, the control unit 10 calculates estimated values for appropriately adjusting the white balance based on the adjustment values obtained when the grayscales are 100% and stored in advance in the storage unit 15 and the adjustment values obtained when the grayscales are 80% and stored in advance in the storage unit 15. In the example described above, the adjustment values obtained when the grayscales of the laser light sources 42 and 43 are 100% are R:G:B=98:97:100, and the adjustment values obtained when the grayscales of the laser light sources 42 and 43 are 80% are R:G:B=85:92:90. In this case, estimated values calculated when the grayscales of the laser light sources 42 and 43 are 90% is calculated by using linear interpolation as follows.

$R=(98+85)\div 2=91.5$ $G=(97+92)\div 2=94.5$ $B=(100+90)\div 2=95$

As described above, the control unit 10 acquires or calculates adjustment values or estimated values for adjusting the white balance based on the grayscales of the laser light sources 42 and 43 by using the function of the adjustment value acquisition section 38 and subsequently controls the light emission control section 18 to adjust the light emission amounts of the laser light sources 42 and 43 in such away that detected values from the color sensor 14 are equal to the adjustment values or the estimated values acquired or calculated by the adjustment value acquisition section 38 (step S14). That is, the control unit 10 controls the light emission amounts of the laser light sources 42 and 43 based on pulse control by using the function of the PWM signal generator 50 to change the light emission output levels of the blue light 20*a*, the red light 20*b*, and the green light 20*c* in such a way that the light amount ratio among the RGB components of the modulated light 28 allows the projector 1 to provide appropriate white balance. In this process, the light emission control section 18 determines adjustment values for adjusting the light amounts of the color light fluxes R, G, and B based on the adjustment values or the estimated values acquired by the adjustment value acquisition section 38 and the detected values from the color sensor 14 and further determines adjustment values for adjusting the light emission amounts of the laser light sources 42 and 43, and the PWM signal generator 50 adjusts the light emission amounts of the laser light sources 42 and 43 based on the thus determined adjustment values.

According to the configuration described above, the light emission amounts of the laser light sources 42 and 43 can be so changed that the light amount ratio among the RGB components of the modulated light 28 detected by the color sensor 14 allows the projector 1 to provide appropriate white balance in accordance with the grayscales of the laser light sources 42 and 43. Further, since the light emission amounts of the laser light sources 42 and 43 are changed based on the light amount ratio among the RGB components of the modulated light 28 projected through the projection system 23 in such a way that the white balance is appropriate, appropriate adjustment can be made and hence a high-quality image can be projected even when the output light amounts of the laser light sources 42 and 43 change due to aging of the laser light sources 42 and 43 and hence the white balance of the modulated light 28 changes in a complicated manner.

As described above, the projector 1 according to the embodiment to which the invention is applied not only includes the plurality of laser light sources 42 and 43 and the light modulation device 22, which modulates light emitted from each of the plurality of laser light sources 42 and 43, but also includes the projection unit 20, which projects the modulated light having undergone the modulation in the light modulation device 22, the storage unit 15, which stores the grayscales of the laser light sources 42 and 43 and adjustment values for adjusting the light emission amounts of the laser light sources 42 and 43 in order to make the white balance of the modulated light 28 projected through the projection unit 20 appropriate with the grayscales and the adjustment values related to each other, and the PWM signal generator 50, which adjusts the light emission amounts of the laser light sources 42 and 43 based on the adjustment values corresponding to the grayscales of the laser light sources 42 and 43. The white balance of the modulated light 28 can be appropriately adjusted based on the adjustment values stored in advance in relation to the grayscales of the laser light sources 42 and 43 even when the grayscales of the plurality of laser light sources 42 and 43 are changed and hence the white balance of the modulated light 28 changes. A high-quality image can thus be projected. Further, the projector 1 includes the laser light source drivers 40 and 41, which drive the plurality of laser light sources 42 and 43, and the PWM signal generator 50 controls the laser light source drivers 40 and 41 based on inputted grayscales of the laser light sources 42 and 43 and the adjustment values acquired from the storage unit 15 to adjust the light emission amounts of the laser light sources 42 and 43. As a result, when the laser light sources 42 and 43 are driven to emit light based on the inputted grayscales of the laser light sources, adjusting the light emission amounts of the laser light sources 42 and 43 based on the adjustment values stored in relation to the grayscales allows the white balance to be appropriately adjusted in correspondence with the light emission amounts of the laser light sources 42 and 43. Further, the storage unit 15 in the projector 1 stores the grayscales of the laser light sources 42 and 43 and the adjustment values in relation to each other, and the projector 1 further includes the light emission control section 18, which adjusts the light emission amounts of the laser light sources 42 and 43 by using the PWM signal generator 50 based on the adjustment values stored in the storage unit 15 when the grayscales of the laser light sources 42 and 43 are set at specific values, whereas adjusting the light emission amounts of the laser light sources 42 and 43 by using the PWM signal generator 50 based on estimated values calculated from the adjustment values stored in the storage unit 15 when the grayscales of the laser light sources 42 and 43 are set at values different from the specific values. As a result, the white balance can be adjusted in correspondence with a variety of grayscales even when only a small number of adjustment values for adjusting the white balance are available. Further, since a large number of adjustment values are not necessary, the period necessary to acquire adjustment values can be shortened. The projector 1 further includes the adjustment value acquisition section 38, which acquires adjustment values that make the white balance of the modulated light 28 appropriate when the grayscales of the laser light sources 42 and 43 are set at the specific values and stores the grayscales of the laser light sources 42 and 43 and the adjustment values in relation to each other in the storage unit 15. Storing the grayscales of the laser light sources 42 and 43 and the adjustment values for adjusting the white balance for the grayscales in relation to each other as described above allows appropriate adjustment of the white balance in correspondence with the light emission amounts of the laser light sources 42 and 43.

The projector 1 further includes the fluorophore wheel 45 and the spectroscopic unit 46, which produce a plurality of color light fluxes from the light emitted from one of the laser light sources 42 and 43 based on color conversion and/or in a spectroscopic manner, and a modulator that modulates the plurality of color light fluxes produced by the fluorophore wheel 45 and the spectroscopic unit 46. The light emission control section 18 determines adjustment values for adjusting the light amounts of the color light fluxes based on the grayscales of the laser light sources 42 and 43 and from the adjustment values stored in the storage unit 15 or the estimated values calculated from the adjustment values stored in the storage unit 15 and further determines adjustment values for adjusting the laser light sources 42 and 43 to adjust the light emission amounts of the laser light sources 42 and 43 by using the PWM signal generator 50. As a result, in the configuration in which a plurality of color light fluxes are produced from the single laser light source 43 based on color conversion and/or in a spectroscopic manner, the white balance can be appropriately adjusted in correspondence with the light emission amounts of the laser light sources 42 and 43. The projector 1 further includes the color sensor 14, which detects the white balance of the modulated light, and the storage unit 15, which holds, after the color sensor 14 detects the white balance of the modulated light produced when the grayscales of the laser light sources 42 and 43 are set at the specific values, the detected values from the color sensor 14, and the adjustment value acquisition section 38 acquires the detected values held in the storage unit 15 as the adjustment values. As a result, when the light beams emitted from the plurality of laser light sources 42 and 43 are combined with each other and projected, the white balance of the light emission amounts of the laser light sources 42 and 43 can be appropriately adjusted based on the detected values from the color sensor 14.

Further, the adjustment value acquisition section 38 in the projector 1 acquires the adjustment values based on measured values obtained by measuring the white balance of the modulated light 28 outside the projector 1 and detected values obtained by detecting the white balance of the modulated light 28 with the color sensor 14. As a result, the adjustment values used when the grayscales of the laser light sources 42 and 43 are set at the specific values can be quickly acquired based on the measured values measured outside the projector 1 and the detected values from the color sensor 14.

The embodiment described above is presented only by way of example of a specific aspect to which the invention is applied and does not limit the invention, and the invention is applicable to an aspect different from the embodiment described above.

Each of the functional portions of the projector 1 shown in FIG. 1 includes a functional component achieved by hardware and software in cooperation with each other, and the specific implementation of the functional component is not limited to a particular one. In addition, the specific detailed configuration of each of the portions in the projector 1 can also be arbitrarily changed to the extent that the change does not depart from the substance of the invention.

Further, the projector 1 according to the present embodiment is a liquid crystal projector including the liquid crystal panel 22a, which modulates the blue light B, the liquid crystal panel 22b, which modulates the red light R, and the liquid crystal panel 22c, which modulates the green light G. The projector 1 is not limited thereto and may alternatively be a projector using digital mirror devices (DMDs).

Moreover, in the present embodiment, the white balance of the modulated light 28 is so adjusted that exact white, that is, an RGB ratio of 100:100:100 is provided. The white balance is not necessarily adjusted this way, and the balance among the color light fluxes contained in the modulated light may be adjusted based on an arbitrarily set color in order to provide a bluish or reddish screen.

Further, the color according to which the balance adjustment is made may be changed in accordance with a color mode setting provided in the projector 1. For example, when the color mode setting is a dynamic setting, the balance adjustment may be so made that white modulated light 28 is produced as in the present embodiment, whereas when the color mode setting is based on a cinema mode, the balance adjustment may be so made that bluish modulated light 28 is produced.

Moreover, the balance adjustment may be so made that optimum-color modulated light 28 is produced in accordance with a projection environment. In this case, the projector 1 may include an illuminance sensor or camera that measures environment light and adjust the balance of the modulated light 28 in such a way that appropriate-color modulated light 28 is produced in accordance with the measured environment light.

What is claimed is:

1. A projector comprising:
a plurality of light sources;
a modulator that modulates light emitted from each of the plurality of light sources;
a projection unit that projects the modulated light modulated by the modulator;
a storage unit that stores grayscales of the light sources and adjustment values for adjusting the light emission amounts of the light sources in order to make white balance of the modulated light projected through the projection unit appropriate with the grayscales and the adjustment values stored in relation to each other, the adjustment values being a light amount ratio among RGB components of the modulated light modulated by the modulator; and
a light-emission-amount adjusting unit that adjusts the light emission amounts of the light sources based on the adjustment values corresponding to the grayscales of the light sources.

2. The projector according to claim 1,
further comprising light source driving unit that drives the plurality of light sources,
wherein the light-emission-amount adjusting unit controls the light source driving unit based on inputted grayscales of the light sources and the adjustment values acquired from the storage unit to adjust the light emission amounts of the light sources.

3. The projector according to claim 1,
further comprising an adjustment value acquisition unit that acquires adjustment values that make the white balance of the modulated light appropriate when the grayscales of the light sources are set at specific values and stores the grayscales of the light sources and the adjustment values in relation to each other in the storage unit.

4. The projector according to claim 1, further comprising:
a color light converter that produces a plurality of color light fluxes from the light from one of the light sources based on color conversion and/or in a spectroscopic manner, and
wherein the controller determines, based on the grayscales of the light sources, adjustment values for adjusting the light amounts of the color light fluxes from the adjustment values stored in the storage unit and further determines adjustment values for adjusting the light sources to adjust the light emission amounts of the light sources by using the light-emission-amount adjusting unit.

5. The projector according to claim 3, further comprising:
a detector that detects the white balance of the modulated light; and
a detected value holding unit that holds the detected values from the detector after the detector detects the white balance of the modulated light produced when the grayscales of the light sources are set at the specific values,
wherein the adjustment value acquisition unit acquires the detected values held by the detected value holding unit as adjustment values.

6. The projector according to claim 5,
wherein the adjustment value acquisition unit acquires the adjustment values based on measured values obtained by measuring the white balance of the modulated light outside the projector and the detected values obtained by detecting the white balance of the modulated light with the detector.

7. A light emission control method in a projector including, a plurality of light sources, a modulator that modulates light emitted from each of the plurality of light sources, and a projection unit that projects the modulated light modulated by the modulator, the light emission control method comprising:

storing, in a storage unit, grayscales of the light sources and adjustment values for adjusting the light emission amounts of the light sources in order to make white balance of the modulated light appropriate with the grayscales and the adjustment values stored in relation to each other, the adjustment values being a light amount ratio among RGB components of the modulated light modulated by the modulator; and adjusting the light emission amounts of the light sources based on the adjustment values corresponding to the grayscales of the light sources.

8. The light emission control method according to claim 7, further comprising:

driving the plurality of the light source based on inputted grayscales of the light sources and the adjustment values acquired from the storage unit to adjust the light emission amounts of the light sources.

9. The light emission control method according to claim 7, further comprising:

acquiring adjustment values that make the white balance of the modulated light appropriate when the grayscales of the light sources are set at specific values; and storing the grayscales of the light sources and the adjustment values in relation to each other in the storage unit.

10. The light emission control method according to claim 7, further comprising:

producing a plurality of color light fluxes from the light from one of the light sources based on color conversion and/or in a spectroscopic manner;

modulating the plurality of produced color light fluxes;

determining, based on the grayscales of the light sources, adjustment values for adjusting the light amounts of the color light fluxes from the adjustment values stored in the storage unit;

determining adjustment values for adjusting the light sources from the determined adjustment values for adjusting the light amounts of the color light fluxes; and adjusting the light emission amounts of the light sources based on the determined adjustment values for adjusting the light sources.

11. The light emission control method according to claim 9, further comprising:

detecting the white balance of the modulated light;

holding the detected values after detecting the white balance of the modulated light produced when the grayscales of the light sources are set at the specific values; and acquiring the held detected values as adjustment values.

12. The light emission control method according to claim 11, further comprising:

acquiring the adjustment values based on measured values obtained by measuring the white balance of the modulated light outside the projector and the detected values obtained by detecting the white balance of the modulated light.

\* \* \* \* \*